US009140262B2

(12) United States Patent
Ramdane et al.

(10) Patent No.: US 9,140,262 B2
(45) Date of Patent: Sep. 22, 2015

(54) TURBOCHARGER EMBEDDING AN ELECTRICAL MACHINE WITH PERMANENT MAGNETS

(71) Applicants: Lateb Ramdane, Vernon (FR); Cornelius Petrus Antonius Vissers, Den Dungen (NL)

(72) Inventors: Lateb Ramdane, Vernon (FR); Cornelius Petrus Antonius Vissers, Den Dungen (NL)

(73) Assignee: SKF MAGNETIC MECHATRONICS, Saint-Marcel (FR)

( * ) Notice: Subject to any disclaimer, the term of this patent is extended or adjusted under 35 U.S.C. 154(b) by 264 days.

(21) Appl. No.: 13/925,713

(22) Filed: Jun. 24, 2013

(65) Prior Publication Data

US 2014/0003979 A1 Jan. 2, 2014

(30) Foreign Application Priority Data

Jun. 22, 2012 (EP) .................................... 12305724

(51) Int. Cl.
| | | |
|---|---|---|
| *F02B 33/44* | (2006.01) | |
| *F02B 37/10* | (2006.01) | |
| *F02B 39/10* | (2006.01) | |
| *F04D 13/06* | (2006.01) | |
| *H02K 21/44* | (2006.01) | |
| *H02K 11/00* | (2006.01) | |
| *H02K 5/173* | (2006.01) | |
| *H02K 7/08* | (2006.01) | |
| *H02K 7/14* | (2006.01) | |

(52) U.S. Cl.
CPC ................ *F04D 13/06* (2013.01); *F02B 37/10* (2013.01); *F02B 39/10* (2013.01); *H02K 11/0005* (2013.01); *H02K 21/44* (2013.01); *F05D 2220/40* (2013.01); *H02K 5/1732* (2013.01); *H02K 7/083* (2013.01); *H02K 7/14* (2013.01)

(58) Field of Classification Search
CPC ...... F02B 37/10; F02B 39/10; F05D 2220/40; Y02T 10/144
USPC .................. 417/350, 405–407, 423.7, 423.12; 60/607; 310/156.01
See application file for complete search history.

(56) References Cited

U.S. PATENT DOCUMENTS

| | | | | |
|---|---|---|---|---|
| 4,769,993 | A | * | 9/1988 | Kawamura ...................... 60/597 |
| 4,874,972 | A | | 10/1989 | Bansal et al. |
| 4,935,656 | A | * | 6/1990 | Kawamura ............... 310/156.08 |
| 6,943,468 | B2 | * | 9/2005 | Iida et al. ......................... 310/54 |
| 7,112,958 | B2 | * | 9/2006 | Yamada et al. ........... 324/207.25 |
| 7,932,656 | B2 | * | 4/2011 | Ozaki et al. ................... 310/90.5 |
| 8,174,141 | B2 | * | 5/2012 | Delf .................................. 290/52 |
| 8,294,319 | B2 | * | 10/2012 | Shibui et al. ............. 310/156.28 |

FOREIGN PATENT DOCUMENTS

| | | |
|---|---|---|
| DE | 1538241 A1 | 9/1969 |
| EP | 0159146 A1 | 10/1985 |

* cited by examiner

*Primary Examiner* — Peter J Bertheaud
(74) *Attorney, Agent, or Firm* — Bryan Peckjian; SKF USA Inc. Patent Dept.

(57) ABSTRACT

An electrical machine (20) coupled to a compressor (12) having a rotatable shaft (16), comprising: a rotor forming part of the rotatable shaft and having at least two magnetic portions (22A, 22B) separated by an inclined non-magnetic portion (24) and two elements (26A, 26B) of non-magnetic material at each end of the rotatable shaft, a stator comprising a laminated magnetic iron stack (28) surrounded by a winding (30) and disposed along a periphery of the rotor to define a first annular gap (32), a ring (34) of non-magnetic material disposed around the stator, and a casing (40) of magnetic material comprising permanent magnets (36), disposed around the non magnetic ring and having radial walls (40A, 40B) that project inwardly towards the rotor by defining a second annular gap (42) therebetween.

13 Claims, 2 Drawing Sheets

TURBOCHARGER EMBEDDING AN ELECTRICAL MACHINE WITH PERMANENT MAGNETS

CROSS-REFERENCE TO RELATED APPLICATIONS

This application claims priority to European patent application no. EP12305724 filed Jun. 22, 2012, the contents of which are fully herein incorporated by reference.

TECHNICAL FIELD

The present invention relates to the field of electrical machines and more particularly to a turbocharger comprising a rotating electrical machine for using in automotive internal combustion engine.

BACKGROUND OF THE INVENTION

Classically, internal combustion engines are equipped with a turbocharger having a turbine driven by the energy of the exhaust gas and a compressor integrally coupled to the turbine. At a low engine speed rotation the turbocharger is assisted by an electrical machine.

As illustrated in U.S. Pat. No. 4,769,993, one way to provide electrical support for turbocharging is to integrate an electric motor into the turbocharger shaft, between the turbine wheel and the compressor wheel. However, this configuration presents some drawbacks. More particularly, the additional length is detrimental to rotor dynamics. The additional inertia leads to a turbolag and reduces efficiency of the turbocharger. Moreover, there are thermal limitations regarding the magnetic/electrical material (magnets or copper) fixed to the rotor, especially for a permanent magnet machine, which is sensitive to high temperature.

SUMMARY OF THE INVENTION

The object of the present invention is to provide an electrical machine preferably for a turbocharger which overcomes these disadvantages of the prior art.

The invention achieves these goals with an electrical machine coupled to a compressor having a rotatable shaft, comprising a rotor forming part of the rotatable shaft and having at least two magnetic portions separated by an inclined non-magnetic portion and two elements of non-magnetic material at each end of the rotatable shaft, a stator comprising a laminated magnetic iron stack surrounded by a winding and disposed along a periphery of the rotor to define a first annular gap, a ring of non-magnetic material disposed around the stator, and a casing of magnetic material comprising permanent magnets, disposed around the non-magnetic ring and having radial walls that project inwardly towards the rotor by defining a second annular gap therebetween.

With this specific structure, no magnets are used in the rotor of the machine.

Advantageously, the magnetic and non-magnetic portions of the rotor have similar mechanical and thermal properties.

Preferably, the stator winding comprises a monophase or polyphase winding arrangement within a plurality of slots.

The elements of non-magnetic material at each end of the rotatable shaft may comprise two discs of non-magnetic material.

Alternatively the elements of non-magnetic material at each end of the rotatable shaft may comprise two bearing assemblies of non-magnetic material, such as ceramic bearings.

Depending of the considered embodiment, the permanent magnets are located at the end of the radial walls facing the at least two magnetic portions of the rotor or are located into the casing around the non-magnetic ring.

The invention also concerns a turbocharger comprising a compressor wheel, a turbine wheel, a rotatable shaft supported in a bearing assembly and coupled to the compressor wheel and the turbine wheel, the rotatable shaft forming a rotor of an electrical machine as previously mentioned.

Advantageously, each end of the radial walls forms an internal support for the bearing assembly that supports the rotatable shaft via the non magnetic disks having a cylindrical structure adapted to also support the compressor and turbine wheels.

According to a specific embodiment the rotatable shaft including the at least two magnetic portions separated by an inclined non-magnetic portion has an elongate bore along a rotation axis of the rotatable shaft, a non-magnetic core is inserted within the elongate bore and the non-magnetic core is secured to the rotatable shaft at least at one end thereof with a nut and a washer of non-magnetic material.

The inclined non-magnetic portion may comprise a non-magnetic washer of oval shape.

BRIEF DESCRIPTION OF THE DRAWINGS

The invention will be better understood in view of the following detailed description, accompanied by illustrative and non-limiting examples with regard to the accompanying drawings, in which.

DETAILED DESCRIPTION

Figure 1:
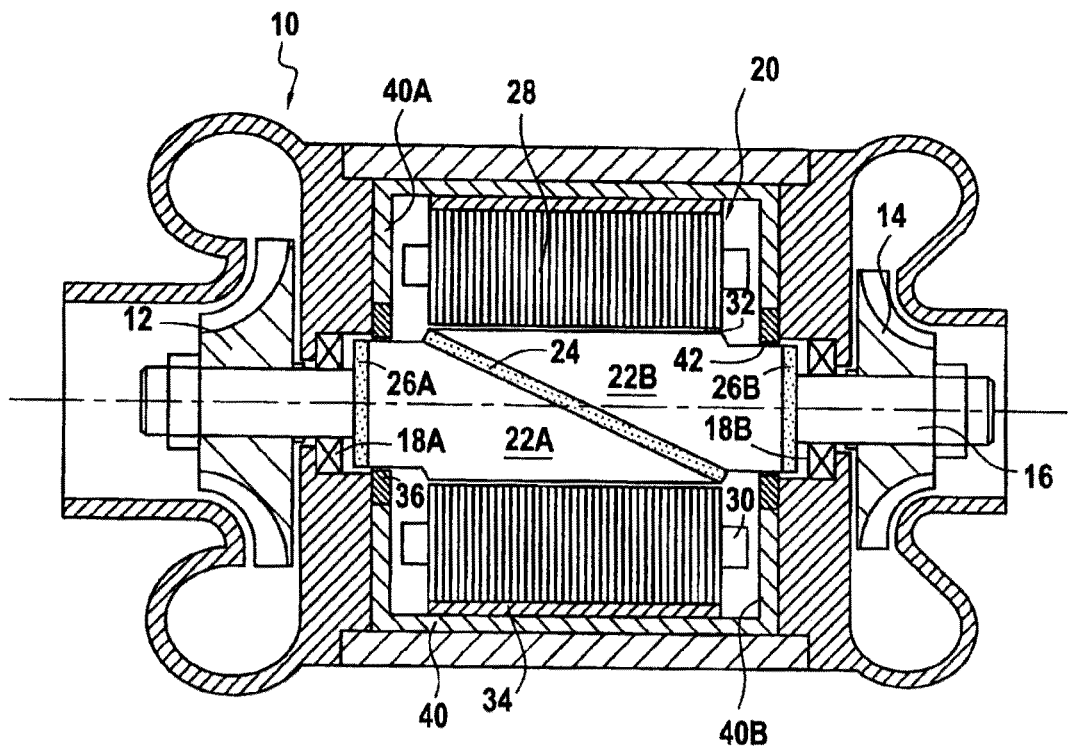
FIG. 1 is a longitudinal section view schematically illustrating an electrically assisted turbocharger according to one embodiment of the invention.

FIG. 1 is a longitudinal section view schematically illustrating one embodiment of an electrically assisted turbocharger preferably for internal combustion engines according to the invention.

Basically, a turbocharger 10 comprises a compressor wheel 12 and a turbine wheel 14 coupled together by a common rotatable shaft 16 supported in a bearing assembly 18A, 18B. Both the turbine and the compressor are illustrated only schematically since they may be of any suitable construction known in the art. For example, the bearing assembly comprises two journal bearings or ball bearings mounted at the opposite ends of the shaft. As known is the art, these ball bearings can be lubricated and cooled by oil via oil passages (not illustrated).

According to the invention, the rotatable shaft 16 which forms a rotor of an electrical machine 20 comprises at least two portions 22A, 22B of a magnetic material separated by an inclined portion 24 of a non-magnetic material and two disks 26A, 26B of a non-magnetic material disposed at each end of the rotatable shaft in order to avoid any loss of magnetic flux in the bearing assembly.

These different portions of the rotor are assembled in such a way that it may withstand important mechanical stresses, in particular at a very high peripheral speed. Moreover, it is necessary to cope with the thermal expansion differences between materials. However, advantageously, both materials are similar in thermal properties as well as in mechanical properties. Classically, hot isostatic pressing (HIP) can be used for that purpose, i.e. all the magnetic and non-magnetic portions are inserted into a sheath and this assembly is put in a HIP chamber at high pressure and temperature. The rotor pieces are then fitted together by diffusion welding.

The electrical machine further comprises a stator comprising a laminated magnetic iron stack 28 surrounded by a winding 30 and disposed along a periphery of the rotor to define a first radial annular gap 32. The stator winding must comprise a monophase or a polyphase winding arrangement within a plurality of slots. A ring 34 of non-magnetic material is disposed around the stator.

A casing 40 of magnetic material is disposed around the non magnetic ring. This casing comprises radial walls 40A, 40B that project inwardly towards the rotor by defining a second radial annular gap 42 between the ends of the walls receiving permanent magnets 36 and the external periphery of the rotor.

Figure 2:
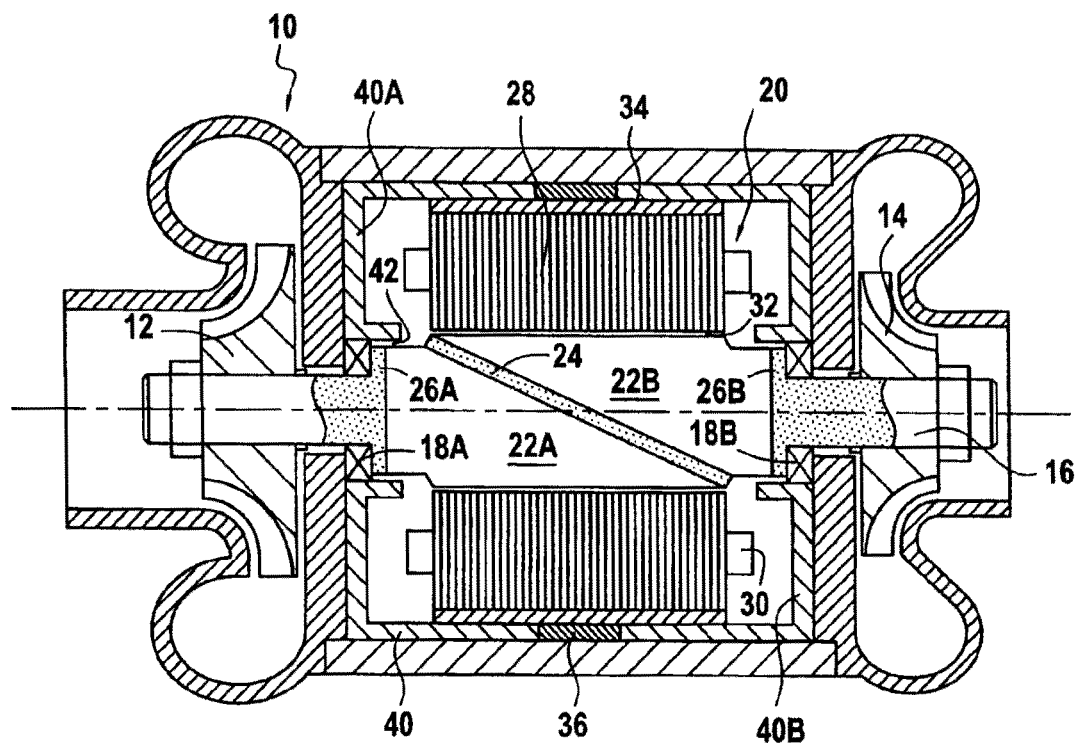
FIG. 2 is a longitudinal section view schematically illustrating an electrically assisted turbocharger according to another embodiment of the invention.

It is important to note that the location of the permanent magnets at the ends of the radial wall 40A, 40B facing the at least two magnetic portions of the rotor (and consequently close to the second annular gap 42) is not compulsory and that a location surrounding the stator into the casing 40 as illustrated in FIG. 2 is also possible.

In the embodiment of FIG. 2, the ends of the radial walls of the casing 40 form an internal support for the bearing assembly 18A, 18B that supports the rotatable shaft 16. More particularly, as illustrated, the bearing assembly 18A, 18B directly supports the non magnetic disks which, according to this embodiment, have a cylindrical structure adapted to also support the compressor and turbine wheels.

The operation of a turbocharger is known and will not be explained in detail. Classically, the turbine wheel 14 is rotated at high speed by the energy of exhaust gas and thereby enables the common shaft 16 to also rotate the compressor wheel 12 in order to introduce air into the engine cylinders. When such a turbocharger comprises an electrical machine 20, as in the invention, its operation is however different and varies depending on whether the electrical machine operates as a motor or as a generator.

When the rotatable shaft 16 rotates at high speed (which is the case in a normal operation of the engine) the rotor forming part of the shaft rotates at high speed too. This rotation of the rotor of the electrical machine (operating thus in generator) generates a magnetic field at the periphery of the rotor with magnetic flux lines extending in a radial direction through the first annular gap 32. This change in the magnetic flux induces an electromotive force in the stator which is picked up from the stator winding 30 to produce electric power supplied to various loads, for example a battery via a rectifier bridge (not illustrated).

When the rotatable shaft 16 rotates at low speed, i.e. when the flow of exhaust gas is low (which is especially the case during the starting of the engine for example), it is possible to induce the compressor to rotate more rapidly by operating the electrical machine as a motor. Indeed, thanks to an AC supply (not illustrated) connected to the stator winding 30, the stator creates a rotating magnetic field in the first annular gap 32. At the same time, the DC field created by the permanent magnets 36 flows through the magnetic circuit 40 and crosses the second annular gap 42. However, the rotor being made of three portions, the magnetic flux generated in the rotatable shaft 16 on one side 22A of the rotor cannot continue to flow in the rotor due to the non-magnetic barriers on the shaft (the central inclined portion 24 and the disks 26A, 26B). The magnetic flux is thus forced to cross the first annular gap 32 and to go into the stator where it follows the classical flux of the laminated stack 28, and then goes back to the rotor (on the other side 22B). The magnetic flux circuit is closed through the magnetic casing 40 and the flux goes back to the left-hand side of the rotor, creating then a classical two poles in the rotor, the rotation of the rotor allowing the rotation of the poles.

Although preferred embodiments have been shown and described, it should be understood that any changes and modifications may be made therein without departing from the scope of the invention. More particularly, if the electrical machine has been illustrated in operation with a turbocharger, it is clear that such a machine could be embedded for example in a moto-compressor or a centrifugal moto-compressor.

The disks 26A and 26B of a non-magnetic material used in the embodiments of FIGS. 1 and 2 could be omitted if the bearing assemblies 18A, 18B are made in a non-magnetic material, such as ceramic bearings.

Figure 3:
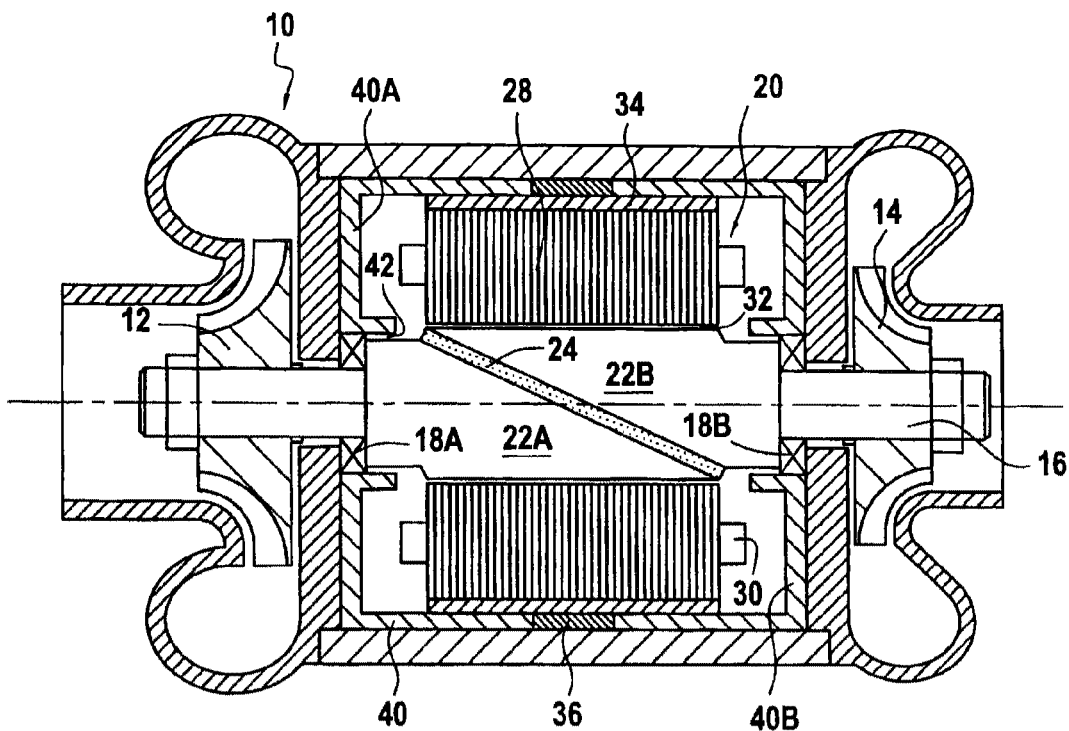
FIG. 3 is a longitudinal section view schematically illustrating an electrically assisted turbocharger according to still another embodiment of the invention.

This is illustrated in FIG. 3 which otherwise corresponds to the embodiment of FIG. 2 but such solution using non-magnetic bearing assemblies 18A, 18B could also be applied to the embodiment of FIG. 1.

Figure 4:
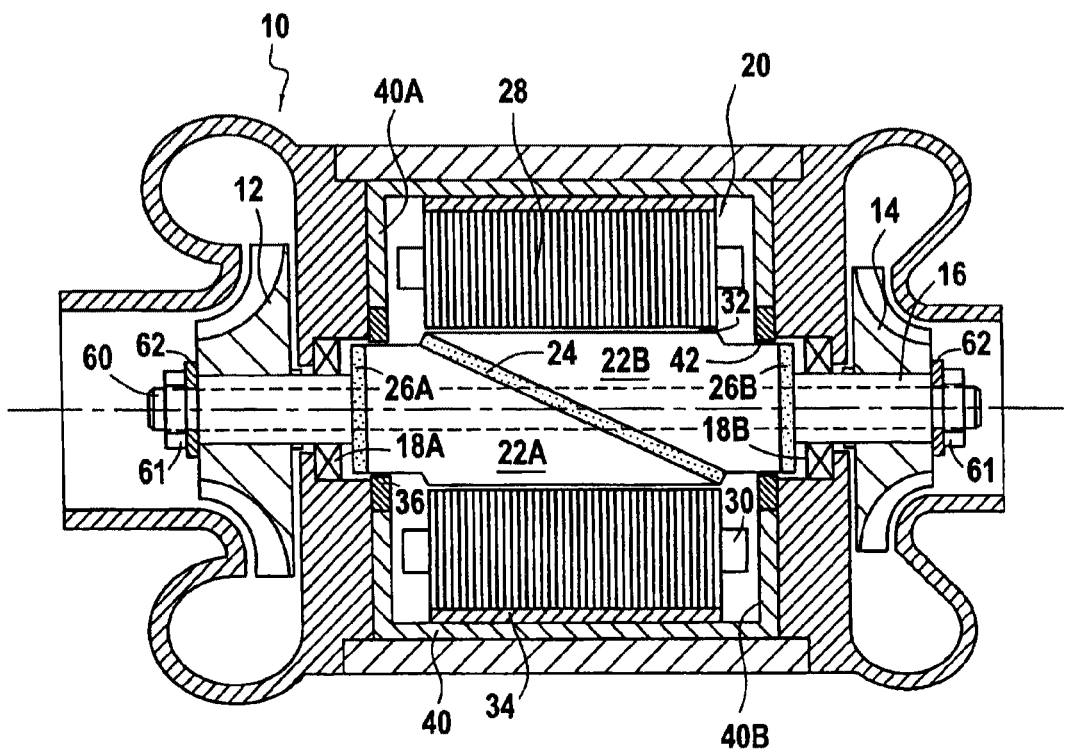
FIG. 4 is a longitudinal section view schematically illustrating an electrically assisted turbocharger according to still another embodiment of the invention.

FIG. 4 shows an example of a possible method for assembling the rotating elements of the turbocharger according to the invention.

The rotatable shaft 16 including the at least two magnetic portions 22A, 22B separated by an inclined non-magnetic portion 24 has an elongate bore along a rotation axis of the rotatable shaft 16. A core 60 or tie-rod made of a non-magnetic material such as aluminum is inserted within the elongate bore and the non-magnetic core 60 is secured to the rotatable shaft at least at one end thereof with a nut 61 and a washer 62 of non-magnetic material. In the example of FIG. 4, a nut 61 and a washer 62 of non-magnetic material are used at each end of the tie-rod 60 to make the non-magnetic tie-rod 60 solid with the wheels 12, 14.

The inclined portion 24 having a through-hole may be constituted by a washer of non-magnetic material.

The method of assembly disclosed with reference to FIG. 4 may be used in combination with any one of the embodiments described with reference to FIGS. 1 to 3 and is simply an alternative avoiding the implementation of hot isostatic pressing.

The invention claimed is:

1. An electrical machine coupled to a compressor having a rotatable shaft, comprising:
   a rotor forming part of the rotatable shaft and having a longitudinal axis, said rotor comprising at least two magnetic portions separated by a non-magnetic portion which extends through the rotor at an angle inclined with respect to said longitudinal axis, thereby dividing said rotor,
   two elements of non-magnetic material at each end of the rotatable shaft,
   a stator including laminated magnetic iron stack surrounded by a winding and disposed along a periphery of the rotor to define a first annular gap,
   a ring of non-magnetic material disposed around the stator, and
   a casing of magnetic material comprising permanent magnets, disposed around the ring and having radial walls that project inwardly towards the rotor by defining a second annular gap therebetween.

2. The electrical machine according to claim 1, wherein the elements of non-magnetic material at each end of the rotatable shaft provide two discs of non-magnetic material.

3. The electrical machine according to claim 1, wherein the elements of non-magnetic material at each end of the rotatable shaft further comprise two bearing assemblies of non-magnetic material.

4. The electrical machine according to claim 3, wherein the magnetic and non-magnetic portions of the rotor have similar mechanical and thermal properties.

5. The electrical machine according to claim 4, wherein the stator winding further comprises a monophase or polyphase winding arrangement within a plurality of slots.

6. The electrical machine according to claim 5, wherein the permanent magnets are located at the end of the radial walls facing the at least two magnetic portions of the rotor.

7. The electrical machine according to claim 5, wherein the permanent magnets are located into the casing around the non magnetic ring.

8. A turbocharger (10) comprising:
a compressor wheel,
a turbine wheel,
a rotatable shaft supported in a bearing assembly and coupled to the compressor wheel and the turbine wheel, the rotatable shaft forming a rotor of an electrical machine, the rotor having a longitudinal axis and comprising at least two magnetic portions separated by a non-magnetic portion which extends through the rotor at an angle inclined with respect to said longitudinal axis, thereby dividing said rotor,
two elements of non-magnetic material at each end of the rotatable shaft,
the electrical machine providing:
a stator comprising a laminated magnetic iron stack surrounded by a winding and disposed along a periphery of the rotor to define a first annular gap,
a ring of non-magnetic material disposed around the stator, and
a casing of magnetic material comprising permanent magnets, disposed around the non-magnetic ring and having radial walls that project inwardly towards the rotor by defining a second annular gap therebetween.

9. The turbocharger according to claim 8, wherein the magnetic and non-magnetic portions of the rotor have similar mechanical and thermal properties.

10. The turbocharger according to claim 8, wherein the stator winding further comprises a monophase polyphase winding arrangement within a plurality of slots.

11. The turbocharger according to claim 8, wherein each end of the radial walls forms an internal support for the bearing assembly that supports the rotatable shaft via the non-magnetic elements having a cylindrical structure adapted to also support the compressor and turbine wheels.

12. The turbocharger according to claim 8, wherein the rotatable shaft including the at least two magnetic portions separated by an inclined non-magnetic portion has an elongate bore along a rotation axis of the rotatable shaft, wherein
a non-magnetic core is inserted within the elongate bore, and wherein
the non-magnetic core is secured to the rotatable shaft at least at one end thereof with a nut and a washer of non-magnetic material.

13. The turbocharger according to claim 12, wherein the inclined non-magnetic portion further comprises a non-magnetic washer of oval shape.

* * * * *